US009456366B2

(12) United States Patent
Morton et al.

(10) Patent No.: US 9,456,366 B2
(45) Date of Patent: Sep. 27, 2016

(54) ALERT-TRIGGERED RECORDING OF SPECTRUM DATA

(75) Inventors: John Morton, Austin, TX (US); Mike Gibson, Austin, TX (US); Bob Mayer, Lakeway, TX (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/298,252

(22) Filed: Nov. 16, 2011

(65) Prior Publication Data

US 2013/0121177 A1 May 16, 2013

(51) Int. Cl.

*H04W 24/08* (2009.01)
*H04W 28/16* (2009.01)
*H04W 52/02* (2009.01)
*H04W 72/08* (2009.01)
*H04L 12/26* (2006.01)
*H04W 24/10* (2009.01)

(52) U.S. Cl.

CPC .......... *H04W 24/08* (2013.01); *H04L 43/0823* (2013.01); *H04L 43/16* (2013.01); *H04W 24/10* (2013.01); *H04W 28/16* (2013.01); *H04W 52/0245* (2013.01); *H04W 72/085* (2013.01)

(58) Field of Classification Search

None

See application file for complete search history.

(56) References Cited

U.S. PATENT DOCUMENTS 6,118,805 A 9/2000 Bergstrom et al.
6,330,450 B1 * 12/2001 Wallstedt ............. H04B 17/318 455/115.3
2007/0032254 A1 * 2/2007 Chen ............................ 455/509
2009/0047906 A1 * 2/2009 Li ............................... 455/63.1
2009/0052574 A1 * 2/2009 Li et al. ........................ 375/296
2009/0149135 A1 * 6/2009 Mangold et al. ............... 455/77
2011/0228693 A1 9/2011 Larson et al.
2013/0064197 A1 * 3/2013 Novak et al. ................ 370/329
2014/0287693 A1 * 9/2014 Li et al. ..................... 455/67.11

OTHER PUBLICATIONS

Canadian Intellectual Property Office, "Office Action" in application No. 2,506,253, dated May 31, 2013, 3 pages.

Current Claims in Canadian application No. 2,506,253 dated May 2013, 5 pages.

Wikipedia, "Frequency-hopping Spread Spectrum" http://en.wikipedia.org/wiki/Frequency-hopping_spread_spectrum, last accessed Jun. 25, 2013, 5 pages.

(Continued)

*Primary Examiner* — Ashley Shivers

(74) *Attorney, Agent, or Firm* — Sterne, Kessler, Goldstein & Fox P.L.L.C.

(57) ABSTRACT

Techniques are described for alert-triggered recording spectrum data. In one embodiment, a method comprises determining whether network performance for one or more communications channels of a wireless network is below a threshold. In response to determining that the network performance for the one or more communications channels of the wireless network is below the threshold, recording of spectrum data for energy on the one or more communications channels of the wireless network is initiated. In an embodiment, determining whether network performance is below a threshold comprises determining whether the quality of at least one communications channel is below a threshold. In another embodiment, determining whether network performance is below a threshold comprises determining whether one or more network parameters monitored on one or more network elements indicate that network performance is below a threshold.

20 Claims, 5 Drawing Sheets

(56) References Cited

OTHER PUBLICATIONS

Wikipedia, "Hedy Lamarr", http://en.wikipedia.org/wiki/Hedy_Lamarr, last accessed Jun. 25, 2013, 5 pages.

Kobayashi et al., "Spatially Divided Channel Scheme" IEEE, 2000, 6 pages.

United Stated District Court for the Western District of Texas Austin Division, "Original Complaint", Case 1:14-cv-00433-SS Document 1 Filed May 9, 2014, *Broadcom Corporation* vs. *Bandspeed*, 13 pages.

United Stated District Court for the Western District of Texas Austin Division, "Original Complaint", Case 1:14-cv-00434-SS Document 1 Filed May 9, 2014, *Broadcom Corporation* vs. *Marvell Semiconductor*, 13 pages.

United Stated District Court for the Western District of Texas Austin Division, "Original Complaint", Case 1:14-cv-00435-SS Document 1 Filed May 9, 2014, *Broadcom Corporation* vs. *Mediatek Inc. and Mediatek USA, Inc.*, 13 pages.

United Stated District Court for the Western District of Texas Austin Division, "Original Complaint", Case 1:14-cv-00436-SS Document 1 Filed May 9, 2014, *Broadcom Corporation* vs. *Qualcomm Incorporated, Qualcomm Atheros, Inc. and Qualcomm Innovation Center Inc.*, 14 pages.

United Stated District Court for the Western District of Texas Austin Division, "Original Complaint", Case 1:14-cv-00437-SS Document 1 Filed May 9, 2014, Stmicroelectronics N.V. and Stmicroelectronics Inc.12 pages.

United Stated District Court for the Western District of Texas Austin Division, "Original Complaint", Case 1:14-cv-00438-SS Document 1 Filed May 9, 2014, Texas Instruments Incorporated, 13 pages.

* cited by examiner

ALERT-TRIGGERED RECORDING OF SPECTRUM DATA

TECHNICAL FIELD

The present disclosure generally relates generally to signal analysis and more specifically to recording spectrum data of a Radio Frequency (RF) signal.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

For a wireless communication system to achieve its maximum throughput and link quality, the impact of outside radio frequency (RF) interference on the communication link must be minimized. Interference occurs when devices other than those used in the communication system emit energy in the same RF spectrum that the communication system uses.

Link performance of a wireless communication system can also be degraded by interference from devices that use the same protocol as the communication system but do not communicate with the communication system. When multiple devices operate in the same communications channel they must share the bandwidth of the communications channel and therefore only obtain a fraction of the throughput they could achieve if they were operating alone in the communications channel.

Interference is common when a wireless communication system operates in an unlicensed band where several other wireless devices are allowed to communicate in the same spectrum. For example, an 802.11b/g communication system operates in the 2.4-2.5 GHz Industrial, Scientific, and Medical (ISM) radio band. Other consumer devices such as microwave ovens, cordless phones, and Bluetooth devices are also permitted to operate in this band. If one of these devices emits a signal using the same frequency spectrum and at the same time as the 802.11 communication system, then the throughput and link quality achieved by the communication system can be significantly reduced.

Real-time spectral displays are often an effective tool for analyzing and diagnosing interference and other performance issues that may be present in a wireless communication system. In many cases, it is useful to view these spectral displays from times in the past to support post-event forensics to determine the cause of interference. However, continuous storage of streaming spectrum data, particularly from a large network of sensors, is inefficient on network and storage resources. It also presents a large amount of recordings which, in turn, can result in inefficiencies in analysis of the history of the RF environment.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. ARCHITECTURE FOR RECORDING SPECTRUM DATA
III. TRIGGERING BASED ON CHANNEL CHARACTERISTICS
IV. TRIGGERING BASED ON NETWORK PERFORMANCE PARAMETERS
V. CONFIGURING THE RECORDING OF SPECTRUM DATA
VI. IMPLEMENTATION MECHANISMS
VII. EXTENSIONS AND ALTERNATIVES

I. Overview

Techniques for alert-triggered recording of spectrum data are described herein. According to some embodiments, the RF environment quality of wireless local area network (WLAN) is monitored. If the RF environment quality is below a threshold, then spectrum data may be recorded to determine whether there is a correlation between energy detected in the RF environment and the degraded network performance.

In contrast to simple recording mechanisms that trigger off a specific waveform or amplitude, some embodiments described herein comprise a more robust triggering mechanism. For example, specific waveforms or amplitudes may be detected and analyzed, but may not trigger the recording of spectrum data if they are not affecting the network performance.

In one embodiment, a method comprises determining whether network performance for one or more communications channels of a wireless network is below a threshold. In response to determining that the network performance for the one or more communications channels of the wireless network is below the threshold, recording of spectrum data for energy on the one or more communications channels of the wireless network is initiated. In an embodiment, determining whether network performance for one or more communications channels of a wireless network is below a threshold comprises determining whether the quality of at least one communications channel is below a threshold. In another embodiment, determining whether network performance for one or more communications channels of a wireless network is below a threshold comprises determining whether one or more network parameters (e.g., packet retries, transmission rate, application performance, etc.) monitored on one or more network elements (e.g., network host, router, or application) indicate that network performance is below a threshold. A computer apparatus, system, or one or more computer-readable media may be configured with instructions to carry out the foregoing steps.

II. Architecture for Recording Spectrum Data

Figure 1:
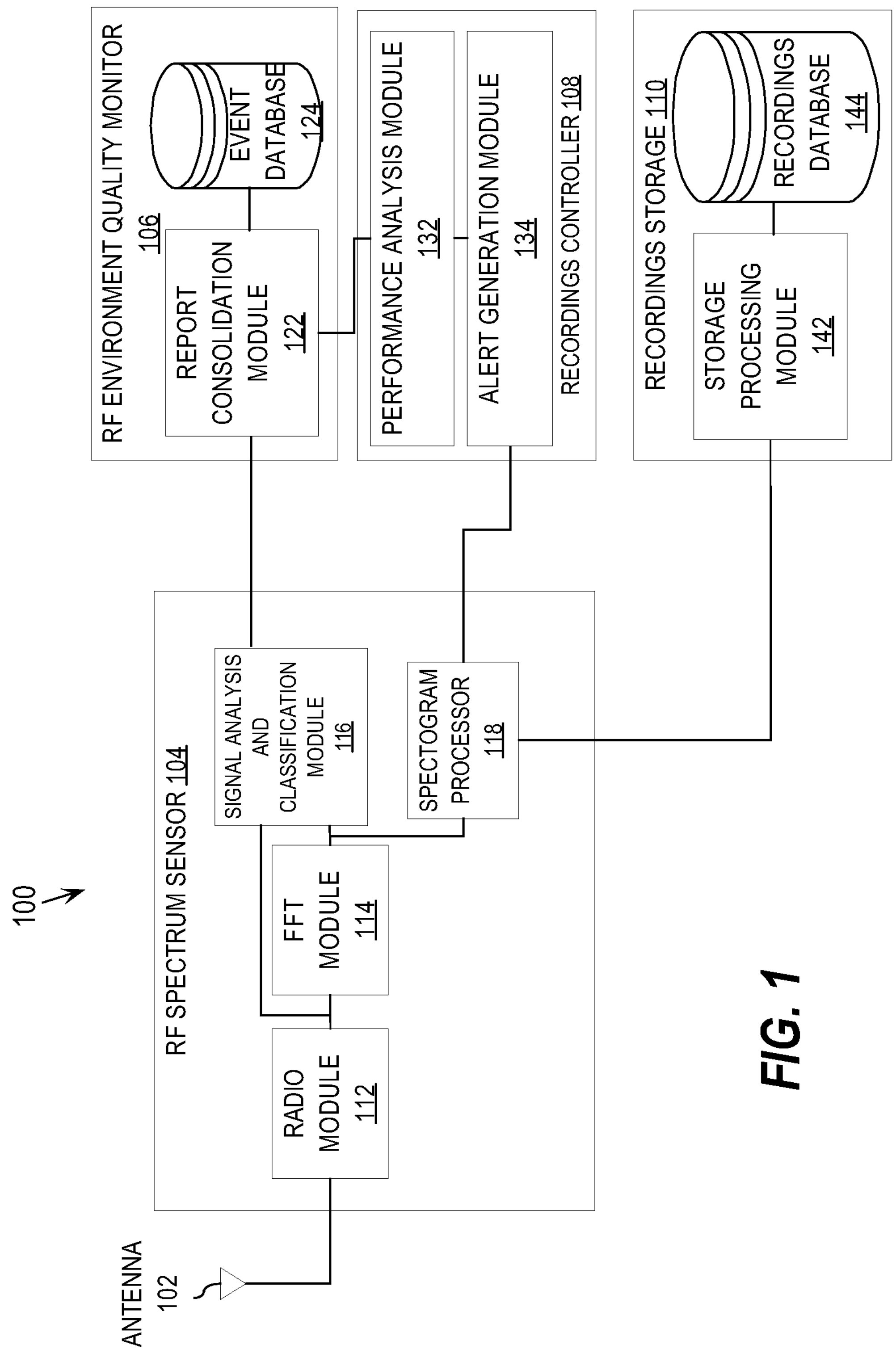
FIG. 1 is a block diagram that depicts an example arrangement for recording spectrum data.

FIG. 1 is a block diagram that depicts an arrangement of an alert-triggered recording system, according to an embodiment. Arrangement 100 includes an antenna 102, an RF spectrum sensor 104, an RF environment quality monitor 106, recordings controller 108, and recordings storage 110. The elements of arrangement 100 may be implemented using electronic hardware elements, software elements, or any combination of hardware and software elements.

RF spectrum sensor 104 is coupled to antenna 102, which is configured to receive signals by, for example, converting electromagnetic radiation, such as RF energy, into electrical current. Antenna 102 may also be optionally configured to transmit signals by converting electrical current into electromagnetic radiation. In one embodiment, RF spectrum sensor 104 includes radio module 112, FFT module 114, signal analysis and classification module 116, and spectrogram processor 118.

Radio module 112 is configured to process signals received through antenna 102 and to provide the processed signal data to FFT module 114 and signal analysis and classification module 116. Radio module 112 may comprise a receiver or a transceiver to convert the signals from antenna 102 to a usable form. In an example embodiment, radio module 112 downconverts the RF signal to baseband, which is sampled by FFT module 114 and signal and classification module 116.

FFT module 114 extracts spectrum data from the baseband signal. For example, FFT module 114 may implement one or more fast Fourier transforms (FFTs) to extract the spectrum data. Alternatively or in addition, FFT module may use one or more other techniques to extract the spectrum data, such as implementing a swept-tuned analyzer, LaPlace transform, wavelet transform, and/or Z transform. In one embodiment, spectrum data comprises frequency-domain information for the RF signal. For example, the spectrum data may comprise measurements of the magnitude of the RF signal at varying frequencies within a frequency range Spectogram processor 118 is configured to process the spectrum data extracted by FFT module 114 and generate spectogram data. In an example embodiment, spectrogram data comprises a time-varying spectral representation for the RF signal. For example, spectrogram data may comprise a collection of spectrum data received from FFT module 114 over a range of time. The spectrogram data may be used to produce advanced spectrum displays, including, but not limited to equalizer displays, persistence displays, and/or scrolling spectograms.

Signal analysis and classification module 116 is configured to analyze time-domain information, provided by radio module 112, and/or frequency-domain information, provided by FFT module 114, for RF signal and to generate report data, as discussed in further detail below.

RF environment quality monitor 106 is configured to monitor the quality of one or more communications channels. In an embodiment, RF environment quality monitor 106 includes report consolidation module 122 and event database 124. Report consolidation module 122 collects the report data generated by signal analysis and classification module 116 and uses the report data to generate and maintain event data, which it stores in event database 124.

Recordings controller 108 is configured to analyze the network environment and to generate alerts to trigger recording of spectrum data. In one embodiment, recordings controller 108 comprises performance analysis module 132 and alert generation module 134. Performance analysis module 132 analyzes event data provided by RF environment quality monitor 106 to determine whether network performance is below a threshold. Performance analysis module 132 may also receive and analyze other network parameters or alerts (not shown) that are provided from external network elements, such as network hosts, routers or applications. If the RF environment quality and/or network performance is below a threshold, then alert generation module 134 generates and sends an alert to spectrogram processor 118 to trigger recording of spectogram data. Alert generation module 134 may also be configured to generate and send alerts to spectrogram processor 118 to stop the recording of spectogram data. The alert to stop the recording of spectogram data may be sent on a timing-based or event-based basis, as described further below.

Recordings storage 110 is configured to store spectrum data. In one embodiment, recordings storage 110 comprises storage processing module 142 and recordings database 144. Storage processing module 142 receives spectrogram data from processor 118 when an alert has triggered recording of spectrogram data. Storage processing module 142 stores the spectrogram data in recordings database 144. A user may access spectrogram data in recordings database 144 to generate advanced spectral displays for an event. The spectrogram data captured by recordings storage 110 may be useful for determining if there is a correlation between energy in the RF environment and the degraded network performance.

The specific arrangement depicted in FIG. 1 may vary from implementation to implementation. For example, signal analysis and classification module 116 may be implemented by RF environment quality monitor 106 instead of RF spectrum sensor 104. Similarly, other depicted elements may also be rearranged, and the functionality of the depicted elements may be implemented as a single element or any combination of multiple elements, depending upon a particular implementation. In addition, elements not explicitly depicted in FIG. 1 may also be incorporated into arrangement 100 to extend or enhance the functionality of arrangement 100.

Figure 2:
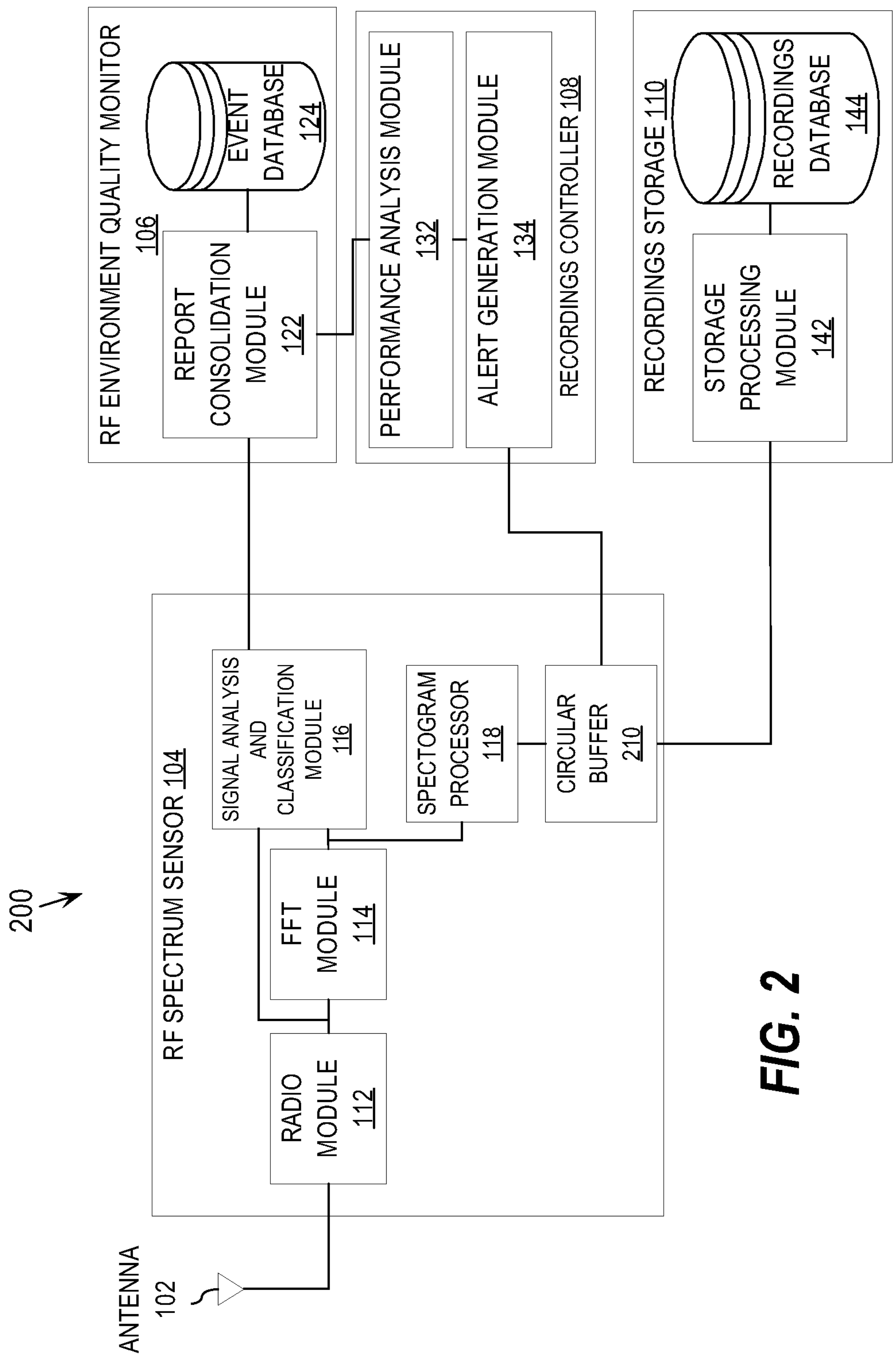
FIG. 2 is a block diagram that depicts another example arrangement for recording spectrum data.

FIG. 2 is a block diagram that depicts an arrangement of an alert-triggered recording system, according to an embodiment. Arrangement 200 includes all the elements of FIG. 1, but integrates circular buffer 210 into the system between spectrogram processor 118 and recordings storage 110. Circular buffer 210 is integrated into the system configured to buffer spectrogram data generated by spectrogram processor 118 and may be implemented as a First-In, First Out (FIFO) memory block. With circular buffer 210, the spectrogram data for a past fixed period of time is temporarily stored. Thus, circular buffer 210 may be used to capture spectrogram data both before the occurrence of an event that causes a recording alert to trigger. Circular buffer 210 may also compensates for any inherent delay in the system's classification of changes in the RF environment. The prior information captured by the buffer allows the user to analyze the RF environment before the interference becomes active, at the time the interference becomes active, and during the time that the interference was active.

Figure 3:
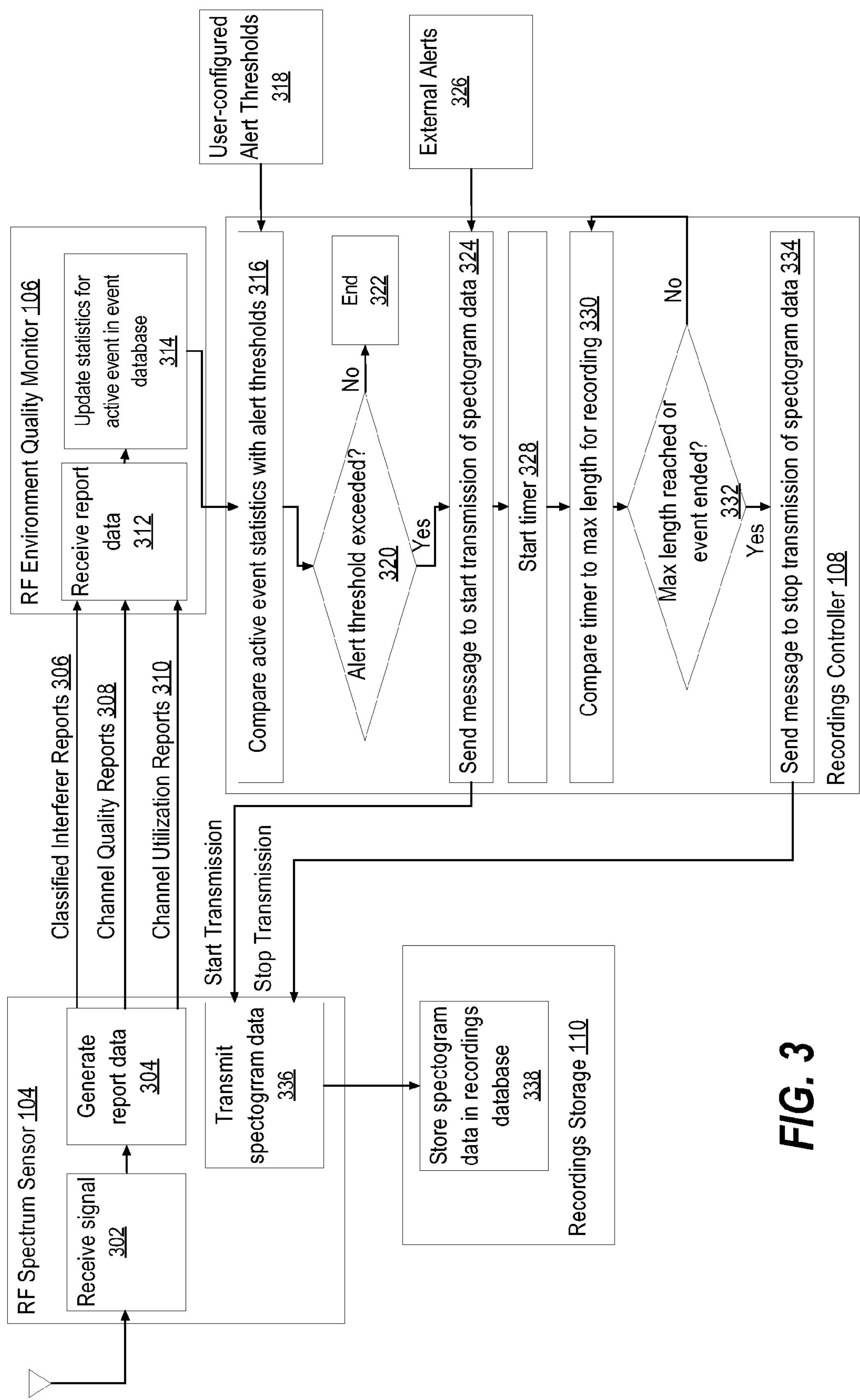
FIG. 3 depicts an example functional implementation of an alert-triggered recording system.

FIG. 3 depicts an example functional implementation of arrangement 100 or arrangement 200. In step 302, RF spectrum sensor 104 receives a signal. In response to receiving the signal, RF spectrum sensor 104 generates report data in step 304. The report data may comprise one or more of classified interferer reports 306, channel quality reports 308, and channel utilization reports 310. The classified interferer reports 306 identify an interferer type that has been detected within the RF environment. Classification of interferers is described in more detail below. The channel utilization reports 310 indicate the rate of utilization of a particular channel. In an embodiment, the channel utilization may specify the percentage of time the channel is occupied by a particular interferer, by a group of interferers, or by all interferers. For example, the channel utilization report may identify the overall channel utilization by known and unknown interferers. The channel quality reports 308 comprise data that indicate the quality of a particular communication channel. In an example embodiment, the channel quality is based on the utilization rate of a channel and the types of interferers detected. For instance, if the channel is not being utilized by an undesired interferer, then the channel quality may be one hundred percent. Conversely, as the number of undesired interferers that occupy a channel increases, then the channel quality may approach zero percent.

In step 312, RF environment quality monitor 106 receives the report data from RF spectrum sensor 104. In step 314, RF environment quality monitor 106 increments statistics for an active event in the event database. In an example embodiment, an active event persists as long as an interferer or type of interferer is active on a particular communications channel.

In step 316, recordings controller compares statistics for an active event with alert thresholds. The alert threshold may be user-configured as indicated by block 318. In step 320, recordings controller 108 determines whether the alert threshold is exceeded based on the comparison performed in step 316. If the alert threshold is not exceeded, then the process ends in step 322. If the alert threshold has been exceeded, then the process continues with step 324, and recordings controller 108 sends a message to RF spectrum sensor to start transmission of spectrum data. Step 324 may also be triggered based on external alerts as indicated by block 326. In an embodiment, these external alerts comprise alerts related to network performance and may be generated by one or more network elements, such as network hosts, routers, network applications. If these alerts indicate that network performance is below a threshold, then a message may be sent to RF spectrum sensor 104 to trigger recording of spectrum data.

In step 336, RF spectrum sensor 104 begins transmission of spectrum data to recordings storage 110 in response to receiving a start transmission message from recordings controller 108. In step 338, recordings storage 110 stores the spectrum data that it receives from RF spectrum sensor 104 in the recordings database 144. The recording of spectrum data, as used herein, may include the recording of any data that can be used to generate a spectral display, including, but not limited to spectogram data as described above. The recording of spectrum data continues until RF spectrum sensor receives a stop transmission message from recordings controller 108. The stop transmission message may be sent in a timing-based or event-based manner, as indicated by steps 328 to 332.

In step 328, a timer is started to limit the amount of spectrum data that is recorded. In step 330, the time is compared to a maximum length for recording. In step 332, recordings controller 108 determines whether a maximum length for recording an event has been reached. If the maximum length has not been reached, then recording continues and the process returns to step 330. If the maximum length has been reached, then recordings controller 108 sends a message to stop transmission of spectrum data at step 334. In addition (as indicated by step 332) or alternatively, recordings controller 108 may determine whether an active event has ended. For example, if interference on a particular channel has stopped or has fallen below a threshold before the maximum length has been reached, then recordings controller 108 may send the message to stop transmission of spectrum data at step 334.

III. Triggering Based on Channel Characteristics

Figure 4B:
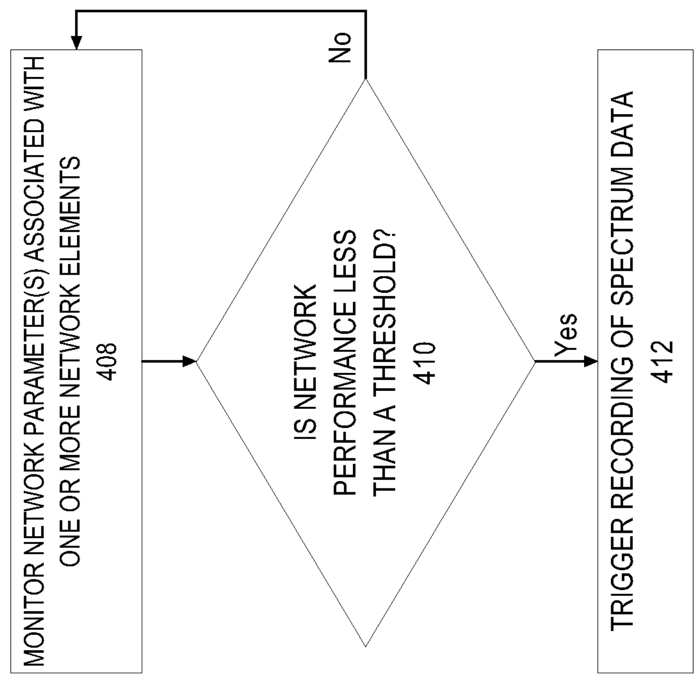
FIGS. 4A and 4B are flow diagrams that depict an approach for triggering recording of spectrum data.
Figure 4A:
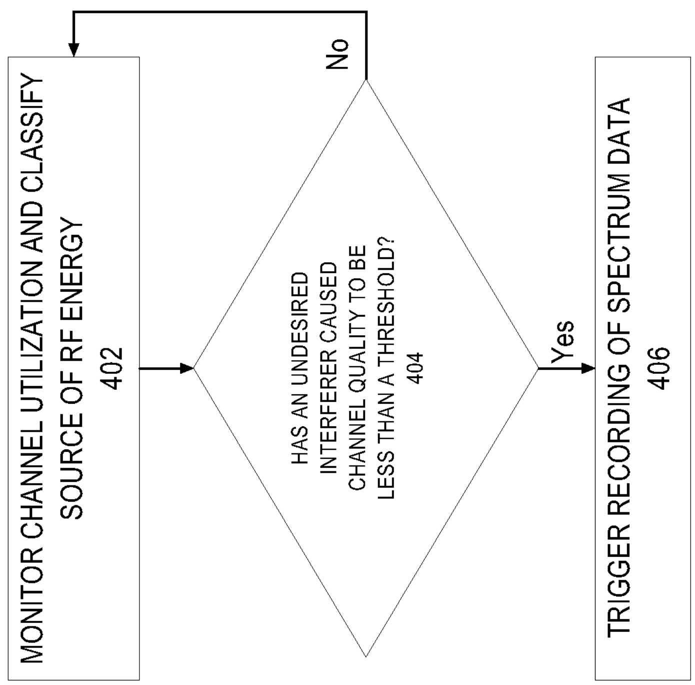

FIG. 4A illustrates an approach to triggering the recording of spectrum data based on channel characteristics, according to an embodiment. In step 402, channel utilization of one or more communication channels is monitored and the source of RF energy detected on the one or more communication channels is classified. In an example embodiment, one or more communication channels of a WLAN are monitored. Typically, WLAN networks implement the IEEE 802.11 standard, branded Wi-Fi, which operates in the 2.4 and/or 5 GHz frequency band. Each frequency band generally comprises a plurality of communication channels, depending on spectrum assignments. These channels may be monitored to help analyze the sources of RF energy that may be affecting performance of the WLAN. For example, certain devices that are not connected to the WLAN may nevertheless interfere with WLAN performance if they generate RF energy within the same operational frequency band. Typical examples of devices that may cause interference include, but are not limited to, cordless phones, microwave ovens, baby monitors, motion detectors, Zigbee devices, and Bluetooth devices. These devices may transmit energy that may corrupt WLAN packets, prevent WLAN transmitters from transmitting signals, and otherwise negatively affect network performance. Thus, classifying the source of energy detected may help detect a correlation between energy detected in the RF environment and the degraded network performance.

The techniques used to classify interferers may vary from implementation to implementation. In an example embodiment, the signal analysis and classification module 116 analyzes time-domain and/or frequency-domain information to detect recognizable patterns. For instance, Wi-Fi devices typically transmit frames that include 802.11 preambles, which the signal analysis and classification module 116 may detect. If the RF signal includes the preamble, then it is classified as Wi-Fi (or WLAN) energy. Accordingly, signal analysis and classification module may report the Wi-Fi channel utilization versus the non-Wi-Fi channel utilization. Similarly, the reports may classify channel utilization by other specific interferers including, without limitation, cordless phones, microwave ovens, baby monitors, motion detectors, Zigbee devices, Bluetooth devices, motion detectors, wireless emitting devices, RF jamming devices, radars, wireless game controllers, wireless audio systems, proprietary wireless bridges, WiMAX devices, broadband wireless transmitters, wireless computer accessories, wireless video cameras, wireless video transmitters, or other any other device that generates electromagnetic radiation. Various techniques may be employed to detect and classify these RF energy sources including, but not limited to analyzing the pulse widths, pulse durations, pulse intervals and other pulse patterns of the RF energy in the time-domain, and analyzing the signal strength, center frequency (peak band), bandwidth, and frequency hopping patterns in the frequency domain. If the source of RF energy cannot be determined, then source may be classified as unknown.

Returning to FIG. 4A, in step 404, it is determined whether an undesired interferer has caused the channel quality to be below a threshold. If the channel quality is not below a threshold, then the process returns to step 402 or the process ends. If the channel quality is below a threshold, then the recording of spectrum data is triggered at step 406.

The channel quality may be determined based on a single channel characteristic or a combination of channel characteristics. Example channel characteristics include, but are not limited to the types of devices or energy detected on a channel, the signal strength of a detected signal, the channel utilization rate by a specific device or type of energy, and the overall channel utilization rate. In one embodiment, RF environment quality monitor 106 captures metrics to measure these channel characteristics based on the report data provided by signal analysis and classification module 116.

An alert may be configured to trigger based on any metrics captured by RF environment quality monitor 106, according to an embodiment. In an example embodiment, an alert may be set to trigger if a specific type of interferer has been detected. For instance, the alert may trigger if a particular non-WLAN device, such as a microwave or Bluetooth device, has been detected on one of the communication channels being monitored. In another example, an alert may trigger if the channel utilization rate within a particular window of time is greater than a threshold percentage.

The alerts may be based on more complex combinations of channel characteristics as well. In an example embodiment, an alert may trigger if a specific interferer, such as a microwave oven, has been detected above a specified signal strength and for longer than the specific minimum duration In another example, an alarm may be set to trigger channel utilization from a specific type of interferer (i.e. a specific type of device or energy) has exceeded a threshold level for the minimum duration specified. Continuing with the present example, the alert may trigger if non-WLAN energy in the RF environment occupies more than 50% of a particular communications channel within a one-minute window. Alerts can also be set to trigger when channel quality has dropped below a pre-defined level, regardless of the interferer, for more than the minimum duration specified. Furthermore, alerts may be set to trigger if unknown interferer types are detected.

IV. Triggering Based on Network Performance Parameters

FIG. 4B illustrates an approach to triggering the recording of spectrum data based on network performance, according to an embodiment. In step 408, one or more network parameters associated with a network element are monitored. The network parameters that are monitored may vary from implementation to implementation. Example parameters include, but are not limited to packet retries, transmission rate, and/or application performance.

In step 410, it is determined whether the network parameters indicate that network performance is less than a threshold. If the network performance is not below the threshold, then the process ends or returns to step 408, and the monitoring continues. Otherwise, the process continues with step 412, and an alert is generated to trigger recording of spectrum data.

The alert may be configured to trigger based on various network parameters, depending on the implementation. In an example embodiment, the alert may trigger in response to the number of packet retries exceeding a threshold. Continuing with the present example, a network host may be unable to transmit packets due to interference in the RF environment. The network host may detect that a threshold number of packet retries has been reached and send an alert to recordings controller 108 to trigger recording of spectrum data. In another example, the alerts may be configured to trigger if the transmission rate, by the network host or other network element, over one or more communication channels associated with the WLAN is below a threshold. In yet another embodiment, the alert may be configured to trigger if performance of a network application is below a threshold. For instance, the alert may trigger if a Voice over IP (VoIP) application drops a call. In another example, the alert may trigger if quality of service (QoS) metric, such as the bit rate, latency, bit error rate, or packet dropping rate, indicate that the application performance is below a threshold.

V. Configuring the Recording of Spectrum Data

Recording of spectrum data may be configured to trigger based on a single alert or based on any combination of the alerts discussed above. The alerts may be pre-defined or may be user-configurable, depending on the implementation. In an example embodiment, a user may enable/disable alerts and configure the thresholds that trigger the recording of spectrum data. The thresholds may be based on any of the metrics captured by the RF Environment quality monitor 106 or any of the network parameters discussed above. The user may also configure the recording to stop based on pre-configured maximum recording limits, including stopping the recording when the alert is no longer active. Accordingly, the alerts and parameters for capturing spectrum data are flexible and may vary from embodiment to embodiment.

VI. Implementation Mechanisms

Figure 5:
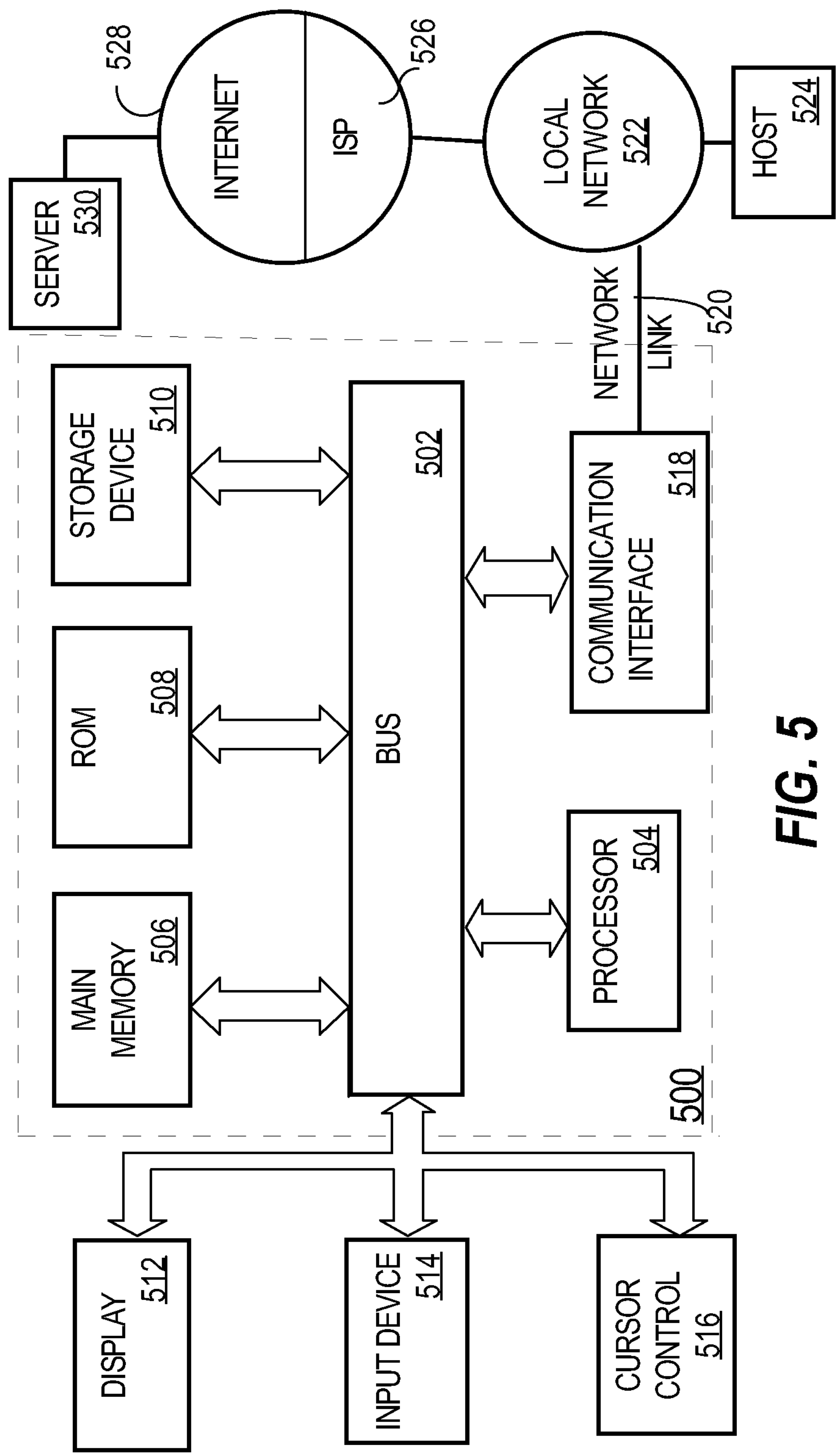
FIG. 5 illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

VII. Extension and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:

processing spectrum data relating to energy on one or more communications channels of a wireless network;

determining whether network performance for the one or more communications channels is below a performance threshold based on the spectrum data;

triggering a recording of subsequent spectrum data if the network performance for the one or more communications channels is below the performance threshold; and triggering a stopping of the recording the subsequent spectrum data when a stop transmission message is received.

2. The method of claim 1, wherein the determining comprises:

determining whether the network performance is below the performance threshold based on the spectrum data and whether a number of packet retries has exceeded a threshold number.

3. The method of claim 1, wherein the determining comprises:

determining whether the network performance is below the performance threshold based on the spectrum data and whether a transmission rate over the one or more communications channels is below a threshold rate.

4. The method of claim 1, wherein the determining comprises:

determining that one or more channel characteristics for at least one communications channel of the one or more communications channels indicate that a quality of the at least one communications channel is below a threshold quality.

5. The method of claim 4, wherein the determining that the one or more channel characteristics indicate that the quality is below the threshold quality comprises:

detecting that a specific type of interferer utilizing the at least one communications channel is above a specified signal strength; and detecting that the specific type of interferer utilizes the at least one communications channel for longer than a specified minimum duration.

6. The method of claim 5, wherein the specific type of interferer comprises an interferer that does not transmit preamble packets based on the Institute of Electrical and Electronics Engineers (IEEE) 802.11 standard.

7. One or more non-transitory computer-readable media that stores instructions, when executed by one or more computing devices, cause the one or more computing devices to perform operations, the operations comprising:

processing spectrum data relating to energy on one or more communications channels of a wireless network;

determining whether network performance for the one or more communications channels is below a performance threshold based on the spectrum data;

triggering a recording of subsequent spectrum data in response to determining that the network performance for the one or more communications channels is below the performance threshold; and triggering a stopping of the recording of the subsequent spectrum data when a stop transmission message is received.

8. The one or more non-transitory computer-readable media of claim 7, wherein the determining comprises:

determining whether the network performance is below the performance threshold based on the spectrum data and whether a number of packet retries has exceeded a threshold number.

9. The one or more non-transitory computer-readable media of claim 7, wherein the determining comprises:

determining whether the network performance is below the performance threshold based on the spectrum data and whether a transmission rate over the one or more communications channels is below a threshold rate.

10. The one or more non-transitory computer-readable media of claim 7, wherein the determining comprises:

determining that one or more channel characteristics for at least one communications channel of the one or more communications channels indicate that a quality of the at least one communications channel is below a threshold quality.

11. The one or more non-transitory computer-readable media of claim 10, wherein the determining that the one or more channel characteristics indicate that the quality is below the threshold quality comprises:

detecting that a specific type of interferer utilizing the at least one communications channel of a wireless network is above a specified signal strength; and detecting that the specific type of interferer utilizes the at least one communications channel for longer than a specified minimum duration.

12. The one or more non-transitory computer-readable media of claim 11, wherein the specific type of interferer comprises an interferer that does not transmit preamble packets based on the Institute of Electrical and Electronics Engineers (IEEE) 802.11 standard.

13. The one or more non-transitory computer-readable media of claim 11, wherein the specific type of interferer is at least one of: a microwave device, a Bluetooth device, a Zigbee device, a cordless phone, a wireless emitting device, a motion detector, a jamming device, a radar, a baby monitor, a wireless game controller, a wireless audio system, a proprietary wireless bridge, a WiMax device, a broadband wireless transmitter, a wireless computer accessory, a wireless video camera, a wireless video transmitter, or an unknown interferer.

14. An apparatus, comprising:

one or more processors; and a non-transitory storage that stores instructions, when executed by the one or more processors, configure the one or more processors to:

process spectrum data relating to energy on one or more communications channels of a wireless network;

determine whether network performance for the one or more communications channels is below a performance threshold based on the spectrum data;

in response to determining that the network performance for the one or more communications channels is below the performance threshold, trigger a recording of subsequent spectrum data; and trigger a stopping of the recording of the subsequent spectrum data when a stop transmission message is received.

15. The apparatus of claim 14, wherein the instructions, when executed by the one or more processors, configure the one or more processors to:

determine whether the network performance is below the performance threshold based on the spectrum data and whether a number of packet retries has exceeded a threshold number.

16. The apparatus of claim 14, wherein the instructions, when executed by the one or more processors, configure the one or more processors to:

determine whether the network performance is below the performance threshold based on the spectrum data and whether a transmission rate over the one or more communications channels is below a threshold rate.

17. The apparatus of claim 14, wherein the instructions, when executed by the one or more processors, configure the one or more processors to:

determine that one or more channel characteristics for at least one communications channel of the one or more communications channels indicate that a quality of the at least one communications channel is below a threshold quality.

18. The apparatus of claim 17, wherein the instructions, when executed by the one or more processors, configure the one or more processors to:

detect that a specific type of interferer utilizing the at least one communications channel above a specified signal strength; and detect that the specific type of interferer utilizes the at least one communications channel for longer than a specified minimum duration.

19. The apparatus of claim 18, wherein the specific type of interferer comprises an interferer that does not transmit preamble packets based on the Institute of Electrical and Electronics Engineers (IEEE) 802.11 standard.

20. The apparatus of claim 18, wherein the specific type of interferer is at least one of: a microwave device, a Bluetooth device, a Zig bee device, a cordless phone, a wireless emitting device, a motion detector, a jamming device, a radar, a baby monitor, a wireless game controller, a wireless audio system, a proprietary wireless bridge, a WiMax device, a broadband wireless transmitter, a wireless computer accessory, a wireless video camera, a wireless video transmitter, or an unknown interferer.

* * * * *